(12) United States Patent
Quek et al.

(10) Patent No.: US 8,268,504 B2
(45) Date of Patent: Sep. 18, 2012

(54) THERMOMECHANICAL SEALING OF INTERCONNECT MANIFOLDS IN FUEL CELL STACKS

(75) Inventors: Shu Ching Quek, Clifton Park, NY (US); Andrew Philip Shapiro, Schenectady, NY (US); Chandra Sekher Yerramalli, Niskayuna, NY (US); Michael Cheadle, Madison, WI (US)

(73) Assignee: General Electric Company, Niskayuna, NY (US)

( * ) Notice: Subject to any disclaimer, the term of this patent is extended or adjusted under 35 U.S.C. 154(b) by 762 days.

(21) Appl. No.: 12/340,918

(22) Filed: Dec. 22, 2008

(65) Prior Publication Data

US 2010/0159304 A1    Jun. 24, 2010

(51) Int. Cl.
H01M 8/02    (2006.01)
H01M 2/18    (2006.01)

(52) U.S. Cl. ......... 429/460; 429/457; 429/458; 429/514
(58) Field of Classification Search ........... 429/400–535
See application file for complete search history.

(56) References Cited

U.S. PATENT DOCUMENTS

| | | | |
|---|---|---|---|
| 4,345,009 A | 8/1982 | Fahle et al. | |
| 6,210,823 B1* | 4/2001 | Hatoh et al. | 429/465 |
| 6,291,089 B1 | 9/2001 | Piascik et al. | |
| 6,291,092 B1 | 9/2001 | Kohli et al. | |
| 6,656,625 B1* | 12/2003 | Thompson et al. | 429/465 |
| 6,824,910 B2 | 11/2004 | Chung et al. | |
| 6,844,100 B2 | 1/2005 | Bourgeois et al. | |
| 6,864,009 B2 | 3/2005 | Yoo et al. | |
| 7,144,651 B2 | 12/2006 | Finn et al. | |
| 7,189,469 B2 | 3/2007 | Tarver | |
| 7,226,687 B2 | 6/2007 | Meacham | |
| 7,252,902 B2* | 8/2007 | Bram et al. | 429/469 |
| 7,358,005 B2 | 4/2008 | Bourgeois | |
| 2003/0175573 A1 | 9/2003 | Yoo et al. | |
| 2004/0131915 A1 | 7/2004 | Sherman et al. | |
| 2005/0153190 A1 | 7/2005 | England et al. | |
| 2005/0221145 A1* | 10/2005 | Leonida et al. | 429/34 |
| 2005/0249996 A1 | 11/2005 | Meacham | |
| 2006/0063057 A1 | 3/2006 | Weil et al. | |

(Continued)

FOREIGN PATENT DOCUMENTS

EP    1710857 A2    10/2006

(Continued)

OTHER PUBLICATIONS

Cverna, Fran. "Chapter 2: Thermal Expansion." Thermal Properties of Metals: ASM Ready Reference. Materials Park, OH: ASM International, 2002. 9-16.*

(Continued)

Primary Examiner — Basia Ridley
Assistant Examiner — James Lee
(74) Attorney, Agent, or Firm — Francis T. Coppa

(57) ABSTRACT

A planar fuel cell stack is provided. The planar fuel cell stack comprises an anode interconnect structure comprising a corrugated first internal manifold connected to a first anode flowfield; a cathode interconnect structure comprising a corrugated second internal manifold connected to a first cathode flowfield; and a thermally active, surface insulated metallic seal disposed between the corrugated parts of the anode and cathode interconnects, such that the thermally active metallic seal responds upon the application of heat to provide sealing between the anode interconnect structure and the cathode interconnect structure.

9 Claims, 4 Drawing Sheets

U.S. PATENT DOCUMENTS

2007/0092781 A1  4/2007  Potnis et al.

FOREIGN PATENT DOCUMENTS

| JP | 2005093403 A | 4/2005 |
| WO | WO2006019295 A1 | 2/2006 |
| WO | WO2008031841 A1 | 3/2008 |

OTHER PUBLICATIONS

Skirl et al. "Thermal Expansion Behavior and Macrostrain of Al2O3/Al Composites with Interpenetrating Networks." Acta Materialia 46.7 (1998): 2493-2499.*

* cited by examiner

| Sample Id. | Interference hole diameter (in) | Overhang length (in) | Leak tank size | Leak time | From (psi) | To (psi) | Surface type | Comments |
|---|---|---|---|---|---|---|---|---|
| 1 | 0.815 | 0.125 | 1 gal | 50m | 2.0 | 2.0 | Soap Solution | |
| 2 | 0.815 | 0.125 | 1 gal | 15hr | 3.0 | 0.2 | Soap Solution | Probably surface dried |
| 3 | 0.815 | 0.125 | 1 gal | 1m 4s | 2.0 | 1.0 | Dry | |
| | | | | 1m 5s | 1.0 | 0.5 | | |
| 4 | 0.835 | 0.125 | 1 gal | 2hr | 3.0 | 3.0 | Soap Solution | Repeated sample |
| 5 | 0.815 | 0.125 | 1 gal | NA | NA | NA | NA | Bad braze |
| 6 | 0.855 | 0.125 | 1 gal | 49m 30s | 3.1 | 2.05 | Vac. Gr. | |
| | | | | 1hr 9m | 2.05 | 1.75 | | |
| | | | | 16hr 24m | 1.75 | 0.70 | | |

FIG. 6

THERMOMECHANICAL SEALING OF INTERCONNECT MANIFOLDS IN FUEL CELL STACKS

BACKGROUND

The invention relates generally to fuel cell stacks and modules for power generation, and more particularly, to the sealing of solid oxide fuel cell stacks.

Fuel cells, for example solid oxide fuel cells (SOFCs), are energy conversion devices that produce electricity by electrochemically combining a fuel and an oxidant across an ionic conducting layer. The fuel cell operating temperatures depend on the material forming the ionic conducting layer. Desirably, power generation systems incorporating high-temperature fuel cells have the potential for higher efficiencies and power outputs. Exemplary high-temperature fuel cells have operating temperatures above about 600° C., and SOFCs typically operate in a range between about 800° C.-1000° C.

A fuel cell produces electricity by catalyzing fuel and oxidant into ionized atomic hydrogen and oxygen at, respectively, the anode and cathode. The electrons removed from hydrogen in the ionization process at the anode are conducted to the cathode where they ionize the oxygen. In the case of a solid oxide fuel cell, the oxygen ions are conducted through the electrolyte where they combine with ionized hydrogen to form water as a waste product and complete the process. The electrolyte is otherwise impermeable to both fuel and oxidant, and merely conducts oxygen ions. This series of electrochemical reactions is the sole means of generating electric power within the fuel cell. It is therefore desirable to reduce or eliminate any mixing of the reactants. Otherwise, a different result might occur, such as combustion, which does not produce electric power, and therefore reduces the efficiency of the fuel cell.

A typical fuel cell operates at a potential of less than about one (1) Volt. To achieve sufficient voltages for power generation applications, a number of individual fuel cells are integrated into a larger component. To create a fuel stack, an interconnecting member is used to connect the adjacent fuel cells together in an electrical series, in such a way that the fuel and oxidants of the adjacent cells do not mix together. For lower temperature fuel cells, e.g., those having an operating temperature of less than about 200° C., a large number of elastomer seals in compression may be used to separate the two reactants. However, elastomer seals cannot withstand the operating temperatures of high-temperature fuel cells. Consequently, other materials, such as glass ceramics, must be used to form the seals. Unfortunately, the seal performance of glass ceramics often remains problematic for high temperature fuel cells, due to its susceptibility to thermal shock and the induced brittleness and spillage. Moreover, the glass seals are not suitable for large gaps, and tend to have leakages over the large sealing perimeters.

Another type of seal used in planar SOFC's is the compression metal seal. These are internal manifolded seals, which are radically different from others, since bonding is not required. Here, sufficient compressive load is applied to deform the metal gaskets and therefore prevent gas leakage. However, in most situations, the internal manifolded seals used in planar SOFC systems typically share vertical loads between the seal region and the fragile ceramic cell or active area. Hence while applying the required load to get a gas-tight seal, there is a risk of breaking or cracking the active area of the cell. An attempt to decouple the load applied to the seal parts and active areas of the cells may prove to be a challenging task for design and manufacturing.

It would therefore be desirable to design a fuel cell stack wherein the cell load is substantially decoupled from the manifold loads. Elements of the present invention are directed at addressing these requirements.

SUMMARY OF INVENTION

In general, the present invention provides a planar fuel cell stack with an effective peripheral seal between the anode and cathode interconnects.

In one aspect of the invention, a planar fuel cell stack is provided which comprises at least one anode interconnect structure, at least one cathode interconnect structure, and a metallic seal. The anode interconnect structure comprises a corrugated first internal manifold which is connected to a first anode flowfield. The cathode interconnect structure comprises a corrugated second internal manifold which faces the first internal manifold and is connected to a first cathode flowfield, i.e., the flowfield of a cathode of the same cell. The metallic seal is thermally active and electrically insulated at the surface of the seal, and is disposed between the corrugated sections of the anode and cathode interconnects. In this manner, the thermally active metallic seal responds upon the application of heat, to provide a sealing between the anode interconnect structure and the cathode interconnect structure.

Another aspect of the present invention is a planar fuel cell stack which comprises at least one anode interconnect structure, at least one cathode interconnect structure, and a combination of metallic seals. The anode interconnect structure comprises a first internal manifold which is connected to a first anode flowfield. The cathode interconnect structure comprises a second internal manifold which faces the first internal manifold and is connected to a first cathode flowfield. The combination comprises multiple seals and is thermally active and insulated in its surface, and is disposed between the internal sections of the anode and cathode interconnects. In this manner, the combination of thermally active metallic seals responds upon the application of heat to provide sealing between the anode interconnect structure and the cathode interconnect structure.

One more aspect of the present invention is to provide a planar fuel cell stack which comprises at least one anode interconnect structure, at least one cathode interconnect structure, and a thermally-active metallic seal. The anode interconnect structure comprises a first internal manifold connected to a first anode flowfield, wherein the first internal manifold comprises a section which is corrugated and insulated on an external surface (i.e., external to the fuel flow). The cathode interconnect structure comprises a second internal manifold connected to a first cathode flowfield, wherein the second internal manifold comprises a section which is corrugated and insulated on one of the external surfaces that faces the first internal manifold corrugated section. The thermally active metallic seal is disposed between the surface insulated corrugated sections of the anode and cathode interconnects, so that the metallic seal responds upon the application of heat to provide sealing between the anode interconnect structure and the cathode interconnect structure.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein:

FIG. 6 is a table representing the results obtained in a prototype-experiment to assess certain properties for one embodiment of a fuel cell stack according to this invention.

DETAILED DESCRIPTION

While only certain features of the invention have been illustrated and described herein, many modifications and changes will occur to those skilled in the art. It is, therefore, to be understood that the appended claims are intended to cover all such modifications and changes as fall within the true spirit of the invention.

Figure 1:
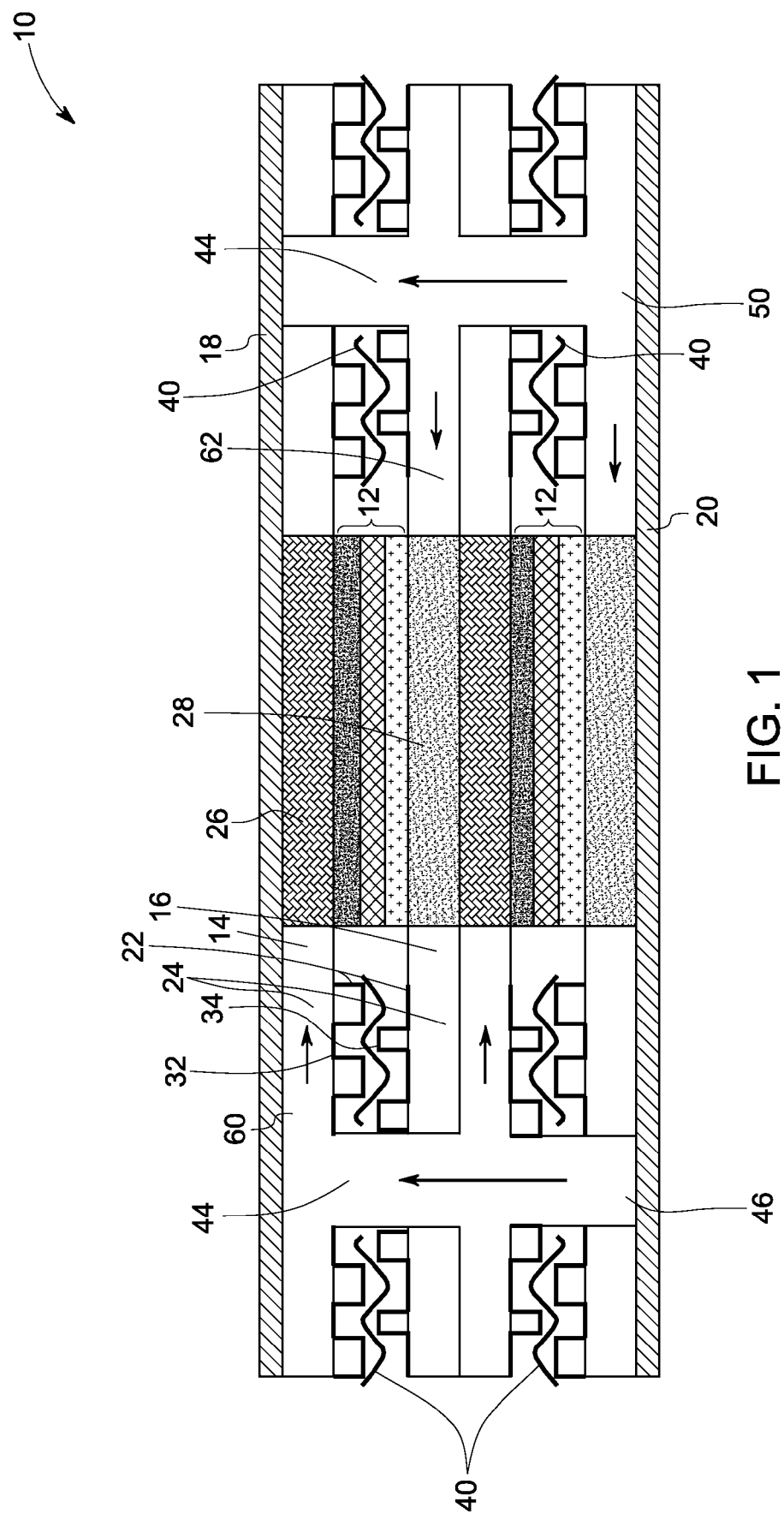
FIG. 1 is a cross-sectional view of an exemplary fuel cell stack.

FIG. 1 is a cross-sectional view of an exemplary fuel cell stack 10 that includes a plurality of fuel cells 12. Fuel cell stack 10 is known as a planar, interconnect-supported fuel cell stack, in which adjacent fuel cells 12 are separated by a plurality of interconnects 14 and 16, such that these interconnects 14 and 16 extend between each pair of adjacent fuel cells 12.

The interconnect 14, connected to the anode side of the cell 12, is referred to as the "anode interconnect". The interconnect 16, connected to the cathode side of the cell 12, is referred to as the "cathode interconnect". In some embodiments, the anode interconnect and the cathode interconnect may be different materials. In other embodiments, the anode interconnect and the cathode interconnect may be combined to act as a bipolar element.

The fuel cells 12 are coupled together in series, such that fuel cell stack 10 includes a top stack plate 18, a bottom stack plate 20, and a plurality of interconnects 14 and 16 that are positioned between top stack plate 18 and bottom stack plate 20. In the exemplary embodiment, each interconnect is hollow and includes outer surface 22 and an internal chamber 24 therein.

In the exemplary embodiment (FIG. 1), top stack plate 18, bottom stack plate 20, and interconnects 14 and 16, are each sized identically. In an alternative embodiment, at least one of top stack plate 18, bottom stack plate 20, and/or interconnects 14 and 16 are sized differently than the remaining fuel cell stack components. Stack plates 18 and 20 are fabricated from an electrically-conductive material. For example, stack plates 18 and 20 may be fabricated from conductive materials capable of operating at higher temperatures as described herein, such as, any material that is electrically conductive.

Each of the interconnects 14 and 16 is also fabricated from an electrically conductive material, such as, but not limited to, conductive materials capable of operating at higher temperatures as described herein. Non-limiting examples include stainless steels, nickel, nickel alloys, FeCr alloys, nichrome, gold, silver, platinum, palladium, ruthenium, rhodium, or various combinations thereof.

The interconnects 14 and 16 further function as the extended manifolds, allowing the passage of the reducing gas for the anode layer and the oxidant for the cathode layer in the fuel cell assembly 10 (FIG. 1). The section of the anode interconnect 14 that is in fluid communication with the anode of the cell 12 can further include various features, e.g., flow guides, baffles, and/or channeling features. This section of the interconnect defines the flow paths which facilitate distribution of the reducing gas, and can be referred to as "anode flow field" 26. The section of the cathode interconnect 16 that is in fluid communication with the cathode of the cell 12 can further include various features, e.g., flow guides, baffles, and/or channeling features. This section of the interconnect defines the flow paths which facilitate distribution of the oxidant, and can be referred to as "cathode flow field" 28.

The interconnects 14 and 16 further include complimentary corrugated structures 32 and 34, respectively, along the outer surface 22, such that there is a clearance space between the complimentary corrugated structures 32 and 34. The corrugation of 32 and 34 can be of one level, or of multiple levels, such that there are secondary, tertiary (and so on) corrugations available within the corrugation 32 and 34 of the interconnects. The corrugated structures can have different shapes in the protruded parts, e.g., square, rectangular, spiked or round edged. The corrugated structure 32 is spaced from the anode flow field 26; and the corrugated structure 34 is spaced from the cathode flow field 28. Furthermore, the corrugated structures 32 and 34 are spaced from cell 12, such that there is no fluid communication in the outer surface 22 between the anode and cathode flow fields 26, 28.

A thermally active metallic seal 40 is disposed between adjacent interconnects 14 and 16, between the corrugated structures 32 and 34, for sealing the direct entrance of fluids from the manifolds to the cell active area.

A thermally active seal responds to the temperature through structural or geometrical changes. In one embodiment the thermally active metallic seal expands when the temperature is increased. The seal 40 should be malleable and ductile enough to maintain a substantial amount of integrity when disposed between the corrugated structures 32 and 34, and when subjected to various temperature, pressure and atmospheric changes. For example, a loss of integrity would be demonstrated by breakage in the seal, such that there is a fluid leakage through the breakage points. In a particular embodiment a seal material made of Inconel® metal (a nickel-based superalloy) was used to seal the ferritic steel interconnects.

The cross-sectional shape and size of the seal is determined according to the designed sealing capability, when subjected to thermal treatment. In one embodiment, the seal is of circular cross-section, and in another embodiment, the seal can be in the form of a strip or foil. In one embodiment the seal is disposed in the general shape of a sine wave, and in another embodiment the seal is disposed in the form of a square wave. In yet another embodiment the seal comprises discontinuous sections, so that it is disposed only in locations where the contact pressures are relatively high.

Figure 3:
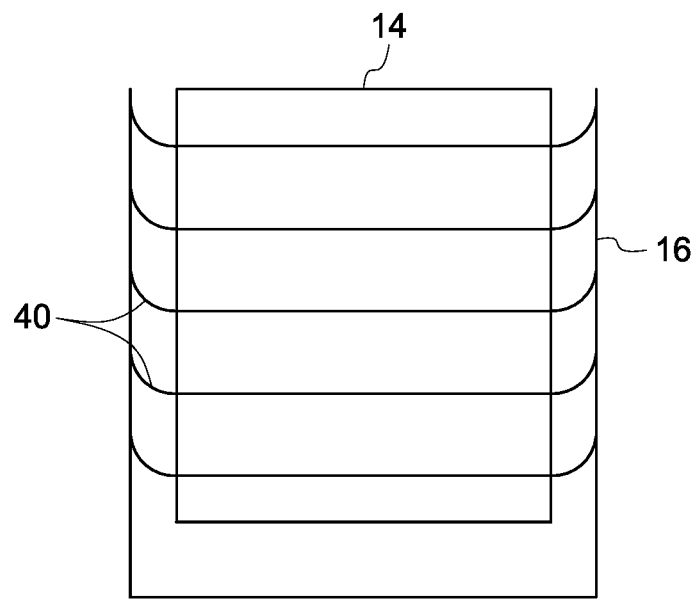
FIG. 3 is an exploded view of a portion of the fuel cell stack in another embodiment.

In yet another embodiment, the seal can include multiple, parallel or criss-crossed sections formed from identical materials, or different materials (FIG. 3). Each sealing section or "portion" can bend and fit into the clearance between the internal sections of the anode and cathode interconnects and exert pressure-sealing when subjected to heat. The size of the cross-section of the seal is such that any material creep does not extensively affect the seal performance. The position of the seal in-between the internal sections of the anode interconnect 16 and cathode interconnect 16 is such that the seal bends and passes through the clearances in-between the interconnect structures. In some embodiments which are generally depicted in FIG. 3, multiple seals overlie each other in a substantially parallel orientation, e.g., in a direction generally perpendicular to the various layers of the cell structure.

Figure 2:
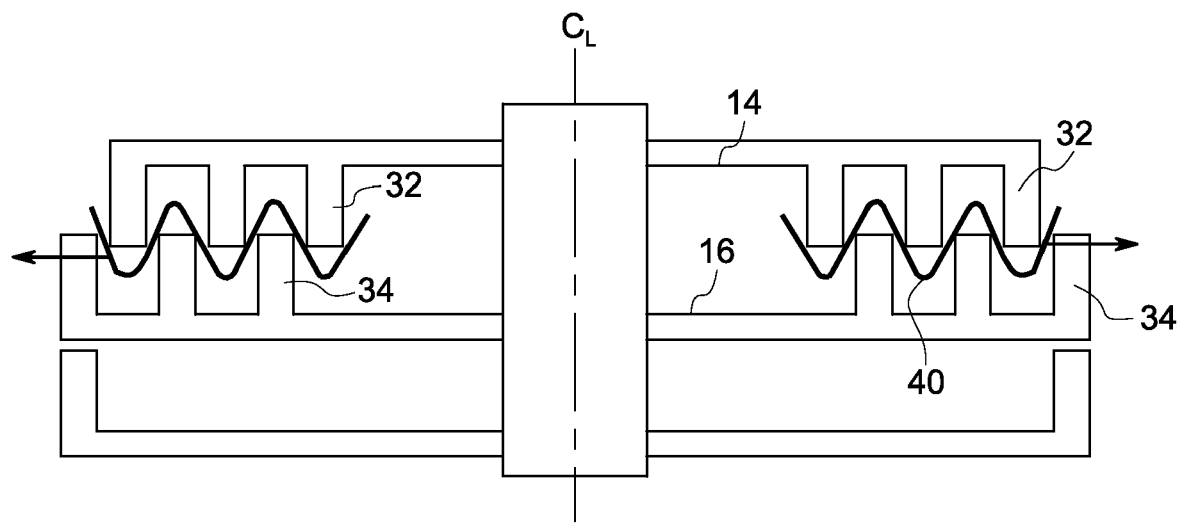
FIG. 2 is an exploded view of a portion of the fuel cell stack in one embodiment.

Another property of interest for the seal material is its thermal expansion. The seal material is expected to have a positive coefficient of thermal expansion. In one embodiment the coefficient of thermal expansion of the seal material is greater than the coefficient of thermal expansion of at least one of the adjacent interconnect materials. In one particular embodiment the coefficient of thermal expansion of the seal material is at least about 110% of that of the materials of the interconnects 14 and 16. In another embodiment the coefficient of thermal expansion of the seal material is less than that of the interconnects, e.g., less than about 90% of the interconnect materials, in some instances. In another particular embodiment the thermally active seal expands in the radial direction of its axis as shown in FIG. 2. In another embodiment, the multiple seals disposed between the corrugated structures 32 and 34 will have different coefficients of thermal expansion, as compared to at least one of the adjacent interconnect materials 14 or 16. In one embodiment the seals are placed adjacent to each other, wherein at least one seal has a thermal expansion coefficient different from an adjacent seal. In another embodiment the seals disposed adjacent to each other have alternating coefficients of thermal expansion. In another particular embodiment, the coefficient of thermal expansion of the seals is gradatively changed from one seal to an adjacent seal. As used herein, 'gradatively changed' refers to the arrangement wherein the coefficients of thermal expansion can change gradually or incrementally from one seal to an adjacent seal. The gradual change in the coefficient is sometimes desirable to avoid the consequences of abrupt changes in the thermal expansion.

Figure 4:
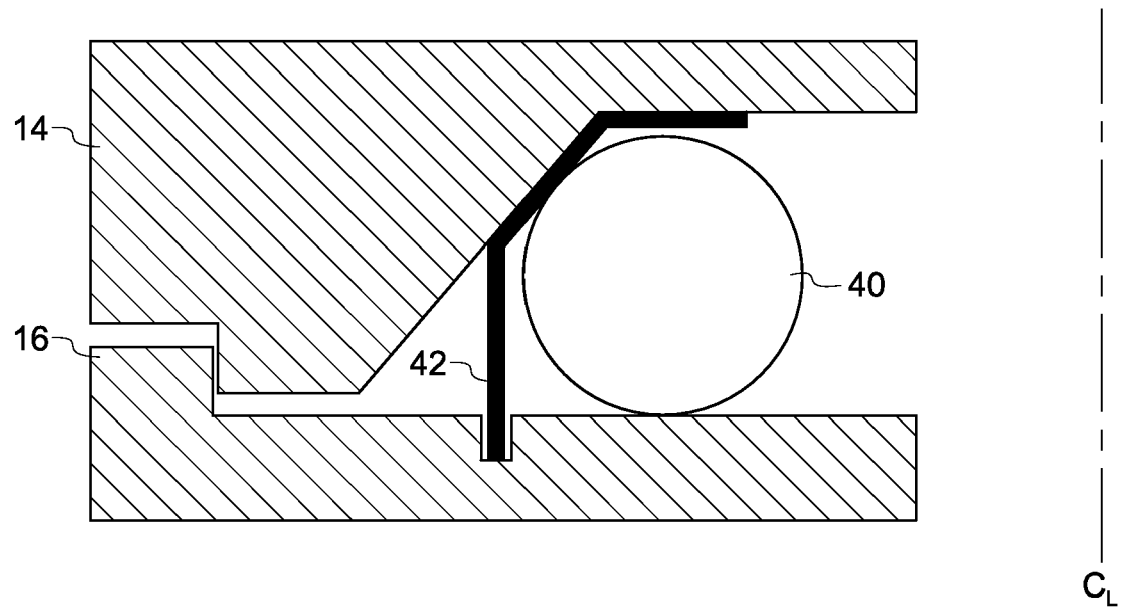
FIG. 4 is an enlarged, partial cross-sectional view of an alternative embodiment of a fuel cell stack.

FIG. 4 shows another alternative embodiment of the fuel cell stack with a thermally active metallic seal. Here, a tongue 42 is disposed between the interconnect and the seal material and acts like a "valve" which is pushed against the interconnects 14 and 16 by the radial thermal expansion of the seal. This creates the sealing action between the interconnects. In one particular embodiment, the tongue 42 comprises an insulating material, wherein the metallic seal need not be surface-insulated by itself, but is still insulated at its surface by the tongue material, preventing electrical contact with the interconnect 14, and thus preventing the short-circuiting of 14 and 16.

In one embodiment the seal used is electrically conducting in its radial direction, and further surface insulated by other means. When an electrically conductive seal is used, the seal is electrically isolated from the interconnects 14 and 16 through different methods. For example, the surface of the seal can be covered or coated by an electrically insulating material, thereby insulating interconnect parts 14 and 16 through the corrugated structures 32 and 34. The insulating effect is maintained, even when the structure is subjected to stresses, e.g., those induced by temperature, pressure and atmospheric changes. In another embodiment, the seal itself comprises an electrically conducting core and an integrated, electrically insulating surface. In yet another embodiment (not specifically shown) the external surface 22 of the corrugated structures 32 and 34 can be covered by an electrically insulating material. The insulating material can be applied or attached by various means, e.g., surface coating, sheathing, and the like. In one embodiment the electrical insulator may comprise a ceramic material, or mica or glass-mica composites. In one particular embodiment a ceramic coating such as alumina or yttria stabilized zirconia is applied to the metallic seal by plasma spray techniques.

In one particular embodiment the seal cover or coating is used primarily for enhancing the sealing capability of the seal and need not be electrically insulating. An example of a seal covering is a commercially available material by the name PS300™ from ADMA, Inc. which is a combination of about 32% Ni alloy, 48% $Cr_3C_2$, 10% Ag and 10% $BaF_2/CaF_2$ eutectic. (Other types of solid lubricant materials can also be modified to a texture which provides the sealing effect discussed herein. Some of those are described in U.S. Pat. No. 5,866,518, which is incorporated herein by reference). As mentioned below, surface coatings applied to the metallic seal, and/or to the external surfaces of the cathode or anode interconnects, can be used to further increase the overall sealing capability of the interconnect structures. As noted above, one of the purposes of the surface coating in certain embodiments is to provide electrical insulation between the interconnect parts 14 and 16 (FIG. 1) at all stages of operation of the stack thereby, preventing short-circuiting. In that instance, the surface insulation should have good malleability and ductility, and suitable thermal expansion properties, so that it is able to maintain its structural integrity. In one embodiment the surface insulation becomes slightly viscous during the operation of the fuelcell, and therefore effectively provides the sealing and the insulation. The structural integrity of the surface insulation is said to be lost when the interconnects 14 and 16 are in electrical communication with each other through the corrugated structures 32 and 34. In one exemplary embodiment, the surface insulation has a thermal expansion value which is in-between the thermal expansion values of the seal material and that of the interconnects 14 and 16.

The combination of the corrugation of the parts, clearance between the parts, seal material, seal shape, surface coating material, surface coating thickness, and the like, are optimized to provide effective sealing of the fluids and the required structural strength to the stack parts when they are in operation.

The aspects and embodiments of the present invention are beneficial for long-term operation of the fuel cell stacks, because they avoid large out-of-plane loads required for most compressive seals. The structure of the stacks allows for the decoupling of active cell area loads/forces from manifold loads. In turn, this allows for internal manifolding, with increased design robustness. The present invention also allows increased sealing pressure at operating temperatures, and incorporates customized seal geometry, which can reduce creep effects.

Figure 5:
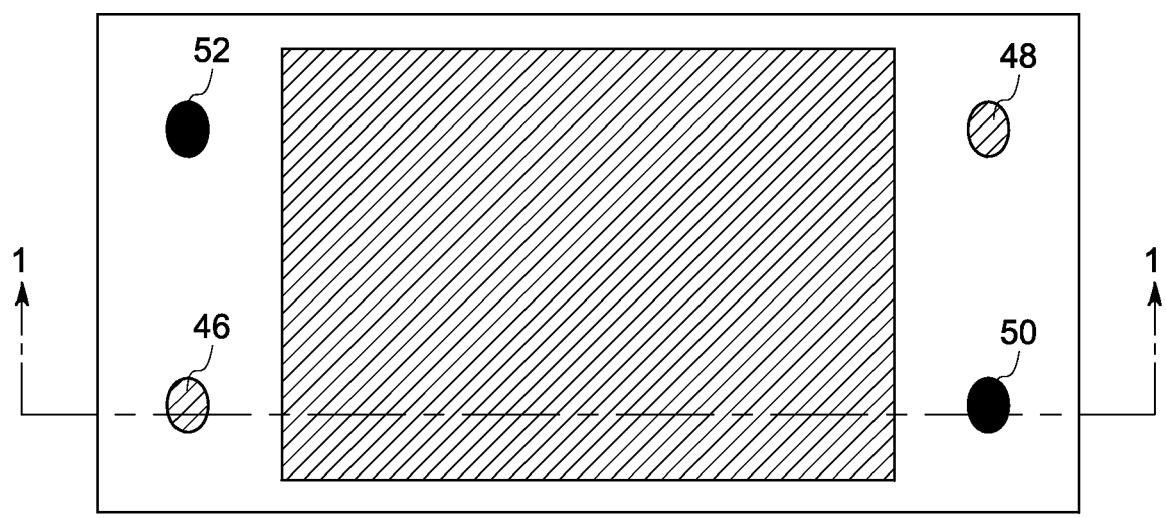
FIG. 5 is the top view of a fuel cell stack that includes a sectional view of FIG. 1, according to one embodiment of the present invention.

With reference to FIG. 1, when the thermally active seal 40 is disposed between interconnects 14 and 16, a plurality of sealed passages 44 are defined. More specifically, in the exemplary embodiment, fuel cell reactants are supplied to, and channeled from, fuel cell stack 10 through sealed passages 44. In the exemplary embodiment, fuel and an oxidant or air are both internally manifolded, and as such, passages 44 include a fuel inlet manifold 46, a fuel outlet manifold 48, an oxidant or air inlet manifold 50, and an oxidant or air outlet manifold 52 (FIG. 5). In an alternative embodiment, the oxidant or air is externally supplied to the fuel cell stack 10.

As depicted in FIG. 1, a plurality of openings 60 and 62 extend at least partially through interconnects 14 and 16, and are in flow-communication with interconnect chamber 24. In the exemplary embodiment, openings 60 and 62 are arranged in a substantially co-linear configuration, i.e., openings 60 and 62 are arranged in a linear sequence within a plurality of rows.

A variety of fuels can be used for the fuel cell stack. Non-limiting examples include pre-reformed fuels; hydrocarbons reformed within fuel cell stack 10; or combinations of such fuels. During operation, the fuel can be supplied to fuel cell stack 10 through fuel inlet manifold 46 (FIG. 5 and FIG. 1). After entering inlet manifold 46, fuel is routed through the sealed passages 44 to each interconnect chamber 24 (FIG. 1). Fuel flows over and reacts with each anode layer prior to being discharged from fuel stack 10 through fuel outlet 48 (FIG. 5). Fuel and oxidant react in each fuel cell 12, and the cells are connected in series within stack 10, to build voltage to useful levels. More specifically, the fuel reacts electrochemically with oxygen, supplied to stack 10 through air or oxidant inlet manifold 50, to generate direct current (DC) electricity with water as the main product. In the exemplary embodiment, stack 10 is arranged such that the fuel cell reactants flow through stack 10 in opposite directions. In another embodiment, stack 10 is arranged such that the flow of each reactant through stack 10 is substantially parallel, and in the same flow direction. Current is generated as the fuel and oxidants react, and a voltage potential is generated across stack 10.

EXAMPLES

The following examples illustrate methods and embodiments in accordance with the invention, and as such should not be construed as imposing limitations upon the claims.

A prototype of an interconnect and a thermally active metallic seal was made by first stacking about 0.1 mm and 0.5 mm E-Brite™ material. The prototype has 6 overhang layers; and the interlayers are brazed together. The test was conducted at room temperature, where the interference causes the leaves or layers to conform to the walls of the mating piece. Sealing pressure will only increase when this seal is brought to operating temperatures if the leave material has a higher CTE than the wall material. The results are given in the table of FIG. 6.

FIG. 6 shows the 3 different interference fits to induce different sealing pressures. Sealing pressures can be interpreted as the amount of interference due to a temperature rise. The leaf overhang length is constant over all the samples but the hole size varies from 0.815" to 0.855" in this experimental embodiment. The wall surface type is also another parameter used to simulate temperature coating requirements to optimize sealing. Thus, at room temperature, a soap solution was used to demonstrate how a well-wetted surface would perform for a particular interference fit, as compared to using a dry/bare surface. The result indicates that a well-wetted surface serves to enhance the thermally actuated seal. This leads to the possible use of glass ceramic seals during operation temperatures of 600-1000° C. where a 'wet' like surface is created between the leaf and wall surface.

Vacuum grease was also used as another alternative, and it functions as a high viscosity coating material at operating temperatures, performing as a surface modifier to promote better sealing. The vacuum grease performed very well, keeping leakage to a minimum, judging from the leak times and pressure drops. The commercial product PS300, developed by ADMA and discussed above, is believed to be capable of providing the grease-like surface for such a coating. This experiment demonstrates that the thermally actuated seal concept will provide effective sealing in some situations. However, in those instances in which manufacturing tolerances may be very tight, surface modification or a surface coating may be needed to enhance the sealing capability.

While the invention has been described with reference to exemplary embodiments, it will be understood by those skilled in the art that various changes may be made, and equivalents may be substituted for elements thereof, without departing from the scope of the invention. In addition, many modifications may be made to adapt a particular situation or material to the teachings of the invention, without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A planar fuel cell stack, comprising: at least one anode interconnect structure which itself comprises a corrugated first internal manifold connected to a first anode flowfield; a cathode interconnect structure comprising a corrugated second internal manifold which faces the first internal manifold; and which is connected to a first cathode flowfield; and a thermally active, surface-insulated metallic seal disposed between the corrugated sections of the anode and cathode interconnects, and configured to respond with radial expansion upon the application of heat, so as to provide sealing between the anode interconnect structure and the cathode interconnect structure.

2. The stack of claim 1, wherein the thermally active metallic seal has a coefficient of thermal expansion which is different from that of at least one of the anode and cathode interconnect materials that are adjacent to the seal.

3. The stack of claim 2, wherein the thermally active metallic seal has a greater coefficient of thermal expansion than that of at least one of the anode and cathode interconnect materials that are adjacent to the seal.

4. The stack of claim 3, wherein the thermally active metallic seal has a coefficient of thermal expansion which is at least about 110% the value of the coefficient of thermal expansion of at least one of the anode and cathode interconnect materials that are adjacent to the seal.

5. The stack of claim 2, wherein the thermally active metallic seal has a lower coefficient of thermal expansion that that of at least one of the adjacent interconnect materials.

6. The stack of claim 1, wherein the metallic seal is at least partially covered by a surface coating.

7. The stack of claim 1, wherein the metallic seal comprises an alloy of at least two metals.

8. The stack of claim 1, wherein the metallic seal, when disposed between the corrugated sections, is substantially sine wave-shaped.

9. The stack of claim 2, wherein the surface insulation has a thermal expansion value which is in-between the thermal expansion values of the metallic seal and one of the anode and cathode interconnect materials.

* * * * *